United States Patent [19]

Ruana

[11] Patent Number: 5,275,319
[45] Date of Patent: Jan. 4, 1994

[54] BICYCLE RACK WIND DEFLECTOR

[76] Inventor: Bruce Ruana, 1093 Airport Rd., Minden, Nev. 89423

[21] Appl. No.: 776,807

[22] Filed: Oct. 15, 1991

Related U.S. Application Data

[63] Continuation-in-part of Ser. No. 501,005, Mar. 29, 1990, abandoned, and a continuation-in-part of Ser. No. 628,725, Dec. 14, 1990, Pat. No. Des. 330,184.

[51] Int. Cl.$^5$ .............................. B60R 27/00
[52] U.S. Cl. .................... 224/316; 224/30 R; 296/78.1; 296/180.1
[58] Field of Search ............ 224/316, 328, 30; 296/180.1–; 280/770

[56] References Cited

U.S. PATENT DOCUMENTS

| | | | |
|---|---|---|---|
| 2,401,245 | 5/1946 | Hobbs | 224/36 |
| 2,914,231 | 11/1959 | Hornke | 224/316 |
| 3,484,130 | 12/1969 | Read | 224/316 |
| 4,066,291 | 1/1978 | Hickman | 296/91 |
| 4,206,942 | 6/1980 | Nudo | 296/180.5 |
| 4,655,497 | 4/1987 | Mallett | 296/78.1 |
| 4,790,555 | 12/1988 | Nobile | 296/78.1 |
| 4,813,583 | 3/1989 | Carpenter | 224/30 R |
| 4,958,761 | 9/1990 | Tenney | 224/316 |
| 5,044,536 | 9/1991 | Gleason | 224/316 |

FOREIGN PATENT DOCUMENTS

| | | | |
|---|---|---|---|
| 2612954 | 9/1977 | Fed. Rep. of Germany | 296/180.1 |
| 20622 | of 1902 | United Kingdom | 296/78.1 |
| 531137 | 7/1940 | United Kingdom | 296/78.1 |

*Primary Examiner*—Linda J. Sholl
*Attorney, Agent, or Firm*—Lawrence S. Cohen; Timothy T. Tyson

[57] ABSTRACT

An airstream deflector apparatus including an elongated body formed of a rigid material and having a parting shape, that is a shape in which a forward facing edge is formed by symmetrical planes to present a streamlined shape which will divert the oncoming airstream to each side. In one form, the body is provided with a pivotable coupling attachment which attaches to a forward portion of the bicycle rack in front of the bicycle itself. When there is no bicycle on the rack, the pivotable coupling between the deflector body and the bicycle rack permits the body to be pivoted downward toward the rear of the vehicle into a stored position.

14 Claims, 8 Drawing Sheets

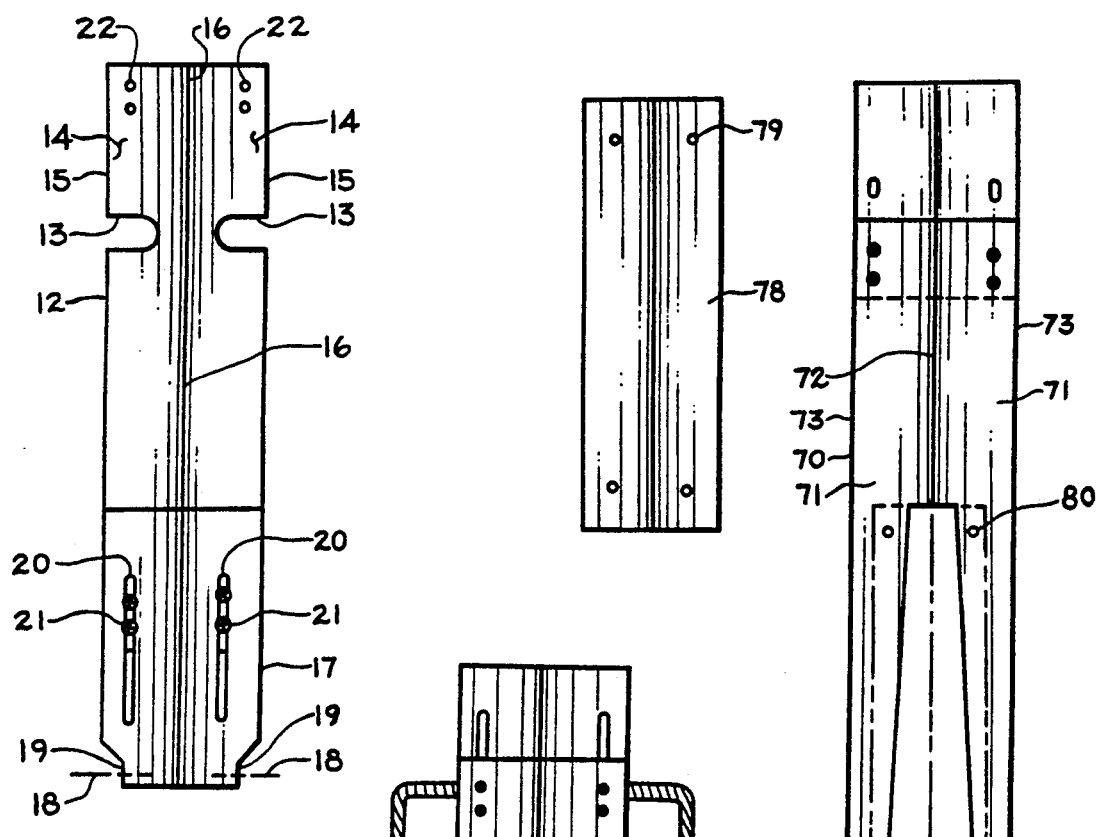
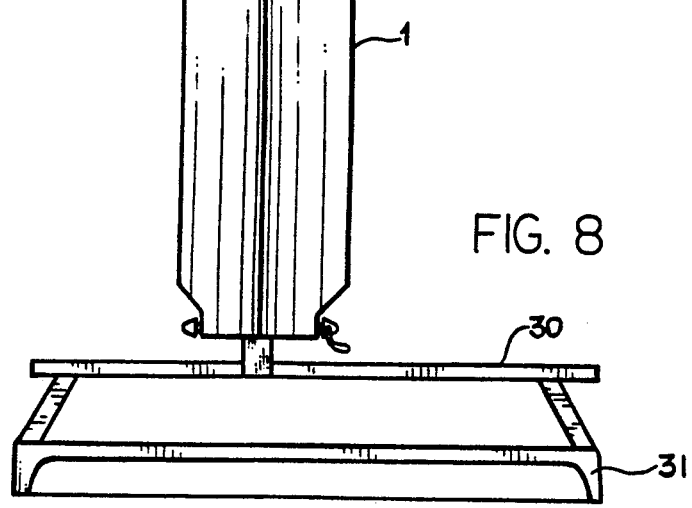
FIG. 6
FIG. 10
FIG. 8

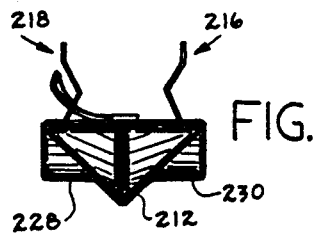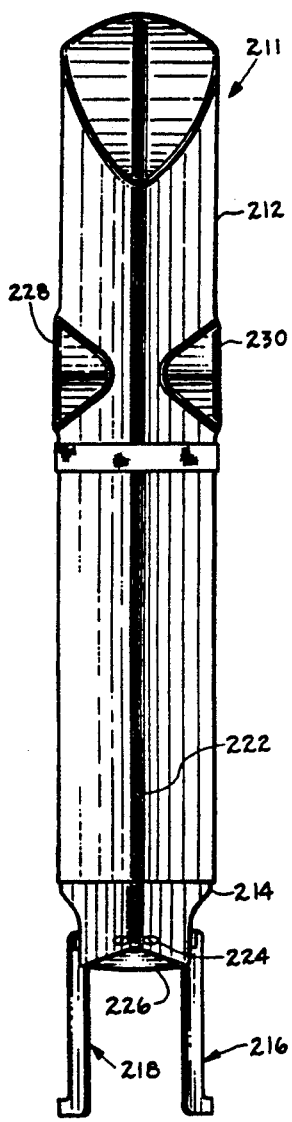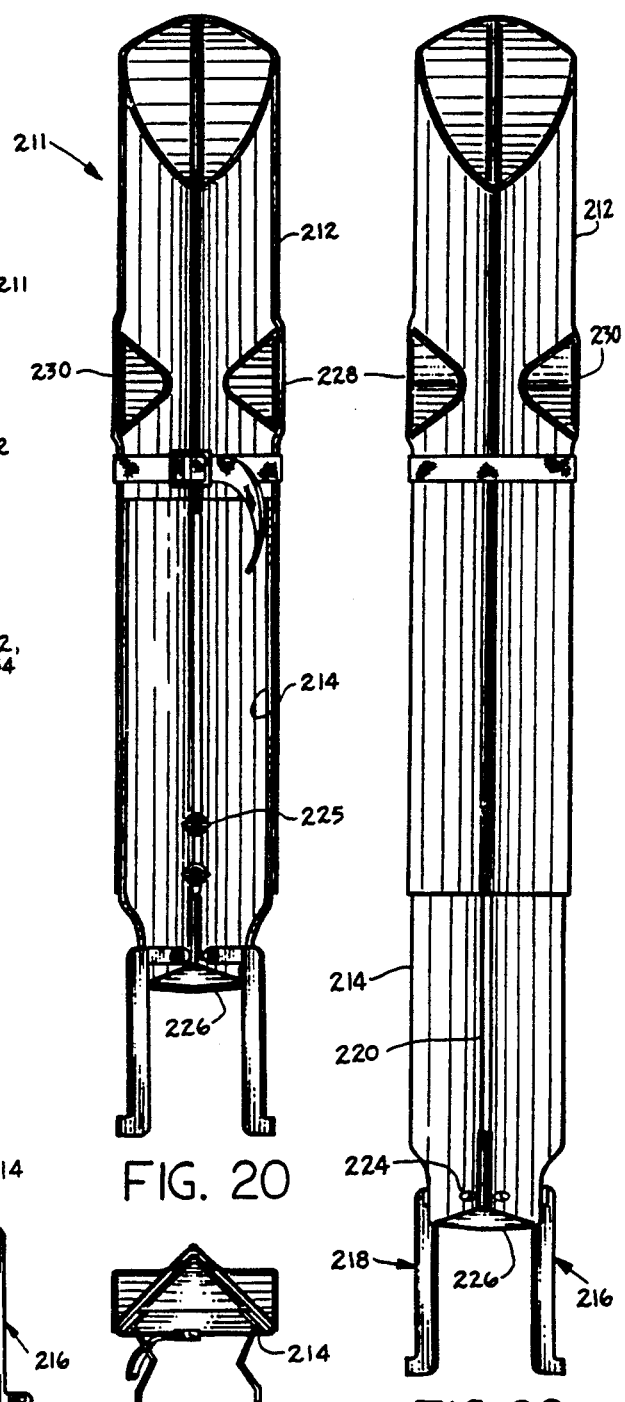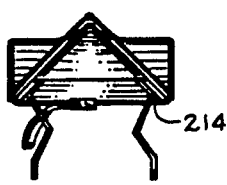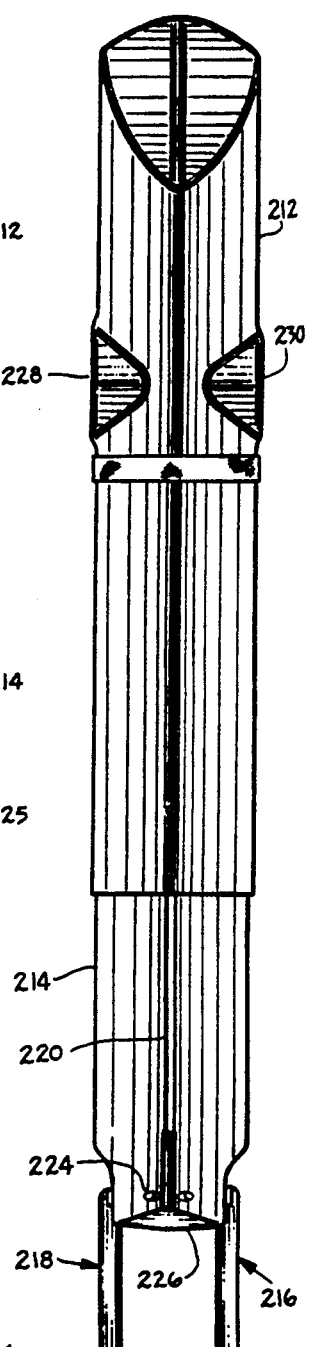

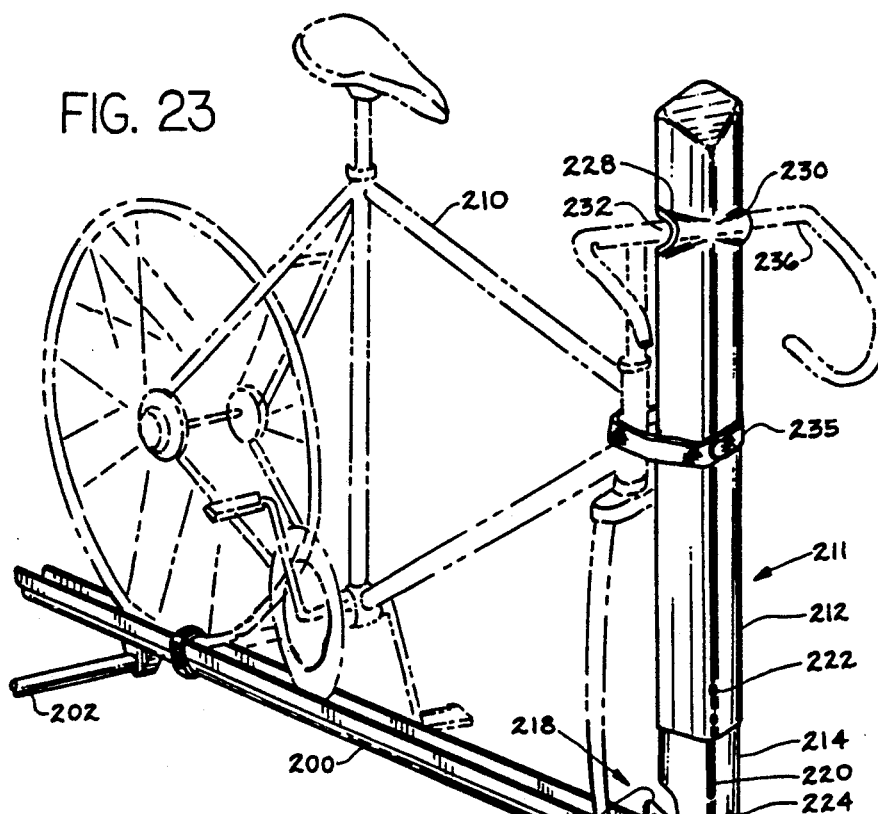
FIG. 23
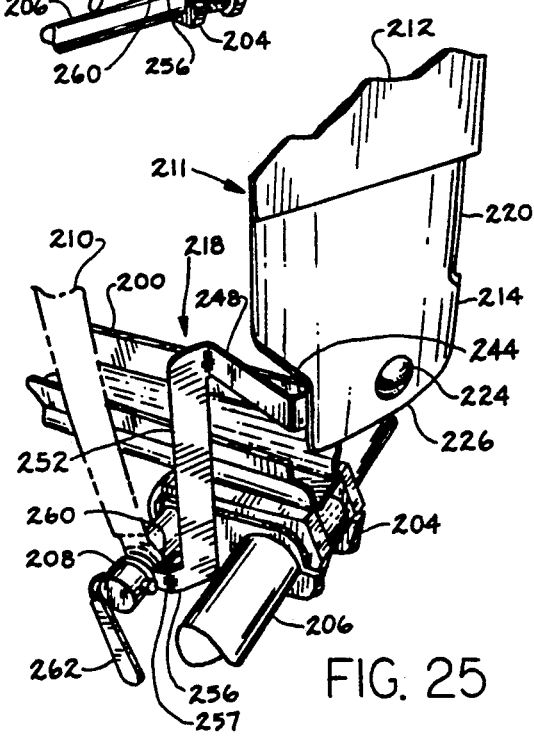
FIG. 24
FIG. 25

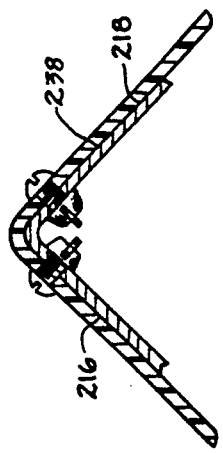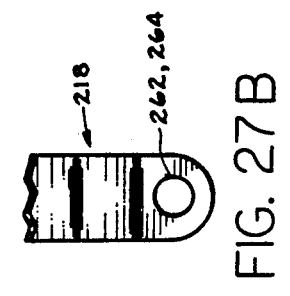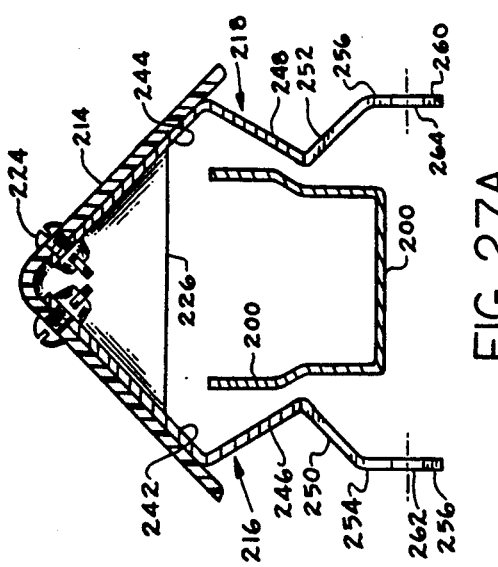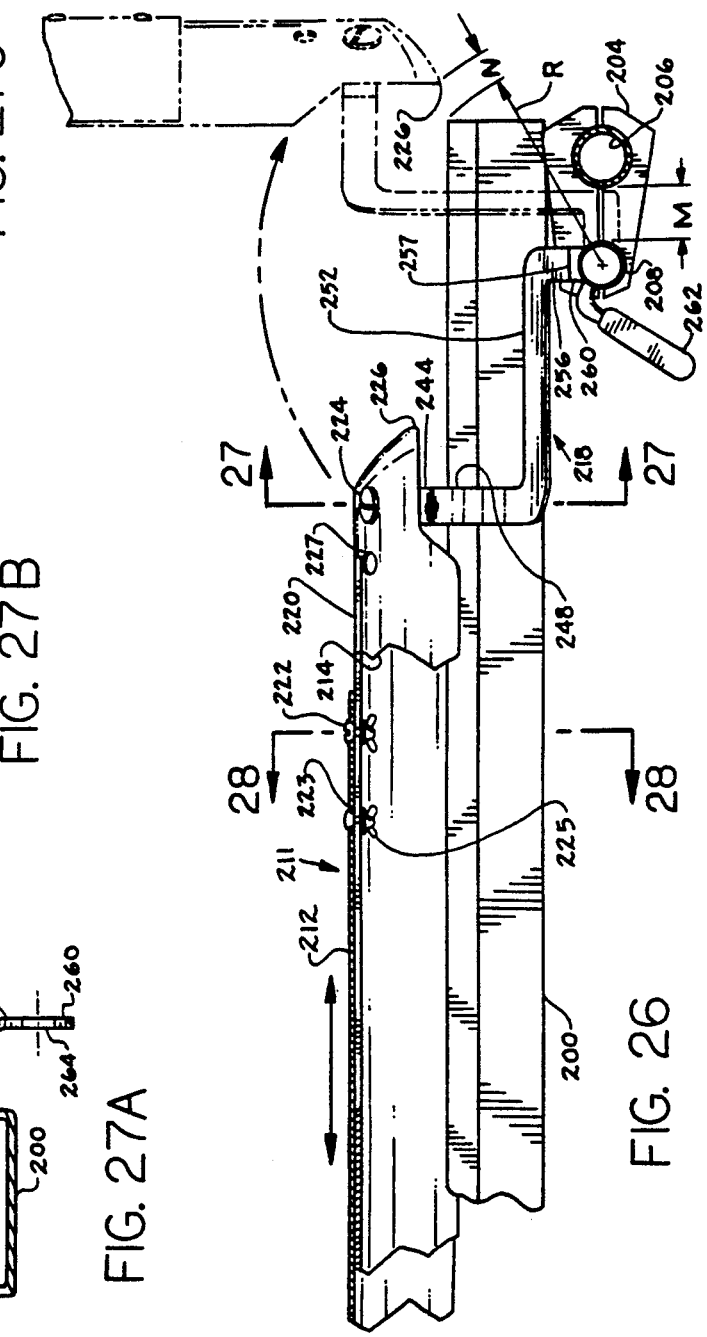

BICYCLE RACK WIND DEFLECTOR

This patent is a continuation-in-part of patent application Ser. No. 07/501,005 filed Mar. 29, 1990 now abandoned and patent application Ser. No. 07/628,725 filed Dec. 14, 1990 now U.S. Des. Pat. No. D330,184 issued Oct. 13, 1992.

BACKGROUND OF THE INVENTION

This invention relates to rooftop carriers for bicycles. More particularly it relates to a wind deflecting device mountable on the carrier or on a bicycle for protecting a bicycle carried on a carrier from the oncoming airstream and from insects and debris.

One particular carrier system is that made by the Thule Company, a well-known Swedish company which manufactures a system having a variety of mounting means for bicycles. The mounting means of particular interest are the upright and fork mount. In the upright type, a bicycle with its wheels attached is fixed upright to the carrier. In the fork mount type, the bicycle is fixed in the upright position, but its front wheel is removed and the front of the bicycle is fixed through the fork by means of what is called a "false axle" or skewer.

One of the primary problems encountered by bicyclists when carrying their bicycles on the roof of a vehicle is the damage and unsightliness and general disagreeableness of insects, dust, exhaust and road spray, impacting the bicycle during travel. Also, there is some lesser frequency of impingement of debris such as pebbles which can cause either cosmetic or functional damage to the bicycle.

It would be of considerable value to have a device for protecting bicycles while in transit from being struck by insects, debris, etc. which is upright in use but which may be pivoted downward and collapsed to a storage position when no bicycle is present on the rack or in the presence of a bicycle when the protective function is not desired or when quick access to the bicycle is desired. In addition, the device would provide for reduction in air resistance by a streamlined shape.

SUMMARY OF THE INVENTION

In accordance with one embodiment of the present invention, an elongated body is formed of a rigid material having a parting shape, that is a shape in which a forward facing edge is formed by symmetrical planes to present a streamlined shape which will divert the oncoming airstream to each side. In one form the body is provided with a pivotable coupling attachment which attaches to a forward portion of the bicycle rack in front of the bicycle itself. Therefore, when the rack is carrying a bicycle, the body is upright with its long dimension extending generally vertically. In transit, the parting shape will separate an oncoming airstream generally symmetrically, thereby diverting insects and debris out of the path of the bicycle and shielding the bicycle therefrom. When there is no bicycle on the rack, the pivotable coupling between the deflector body and the bicycle rack permits the body to be pivoted downward toward the rear of the vehicle into a stored position. Also, when there is a bicycle on the rack, the deflector may be pivoted to the stored position. In another embodiment of the invention a slot is formed in the body to permit straddling the bicycle wheel, when the bicycle is fitted to the rack in an upright position with the wheel attached. The novel features of the invention are set forth with particularity in the appended claims. The invention will be best understood from the following description when read in conjunction with the accompanying drawings.

BRIEF DESCRIPTION OF THE DRAWINGS

FIG. 6 is a front elevation view of an alternative embodiment;

FIG. 8 is a front view of the combination of FIG. 7;

FIG. 10 is a front elevation view of an alternative embodiment;

FIG. 17 is a top plan view of another embodiment of the bicycle rack wind deflector;

FIG. 18 is a front elevational view thereof;

FIG. 19 is a left side elevational view thereof, the right side elevational view being the mirror image thereof;

FIG. 20 is a rear elevational view thereof;

FIG. 21 is a bottom plan view thereof;

FIG. 22 is a front elevational view showing an extended position;

FIG. 23 is a front angle perspective view of the wind deflector and a rack along with a bicycle shown in phantom lines;

FIG. 24 is a rear angle partial perspective view of the wind deflector and a rack along with a bicycle shown in phantom lines showing in detail attachment of the deflector and a bicycle to a false axle on a rack;

FIG. 25 is a front angle enlarged partial perspective view of the wind deflector and a rack with a bicycle shown in phantom lines showing in detail attachment of the deflector and a bicycle to a false axle on a rack;

FIG. 26 is a side elevational view of the embodiment of FIGS. 17–25 showing in detail the deflector in the stored position with no bicycle in place;

FIG. 27A is a sectional view through 27—27 of FIG. 26;

FIG. 27B is a side view of a portion of FIG. 27A.

FIG. 27C is a sectional view showing an alternate construction of that shown in FIG. 27A;

DESCRIPTION OF THE PREFERRED EMBODIMENTS

Figure 1:
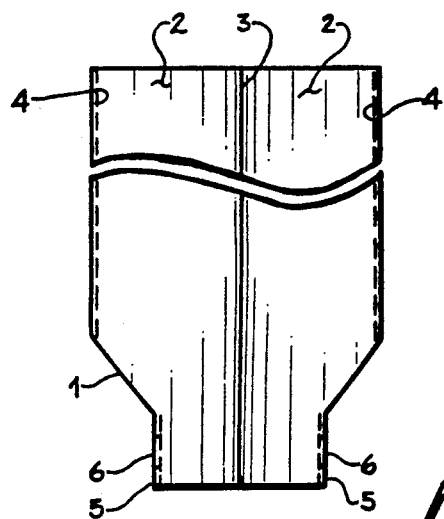
FIG. 1 is a front elevation view of an embodiment of the invention.
Figure 2:
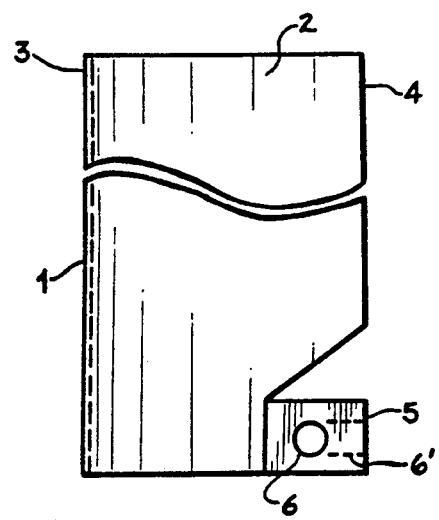
FIG. 2 is a side elevation view of the embodiment of FIG. 1.
Figure 3:
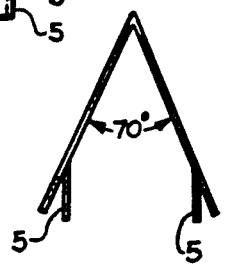
FIG. 3 is a top view of the embodiment of the FIGS. 1 and 2.

One form of the invention is shown in FIGS. 1, 2 and 3. In this embodiment, a main body portion 1 is formed from a suitably rigid material such as metal or plastic bent or otherwise formed to present a generally "v" or other wind parting, or streamlined shape. In this form, generally symmetrical side planes 2 extend from a leading edge 3 at an angle of about 70°-110°, preferably about 90°, terminating in trailing edges 4 to form the airstream deflection portion. Actually the key factor in the configuration rests in the projected width, which must be sufficient to shield the bicycle. At the lower terminal end of the body and to the rear of each side plane 2 are formed tabs 5. In each tab 5 there is a circular hole 6 so that the tab 5 and hole 6 comprise a pivotable mounting, the tabs 5 being parallel to each other. The hole 6 could instead be a slot such as indicated at 6' in order to facilitate fitting as will be apparent from the following detailed description. As will be seen from the description below, it is preferable that the tabs 5 be separated by about 3.5 to 4 inches. The full length of the body along its elongated dimension may vary, but a length of about 36 inches has been found suitable for most applications.

Figure 4:
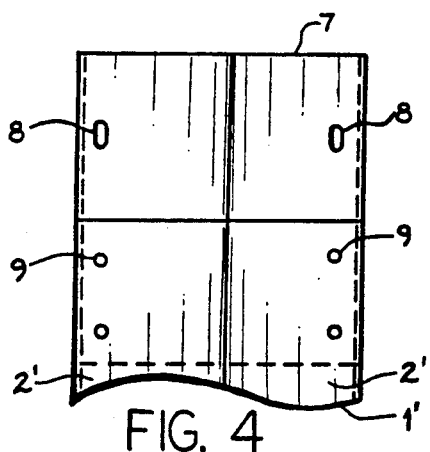
FIG. 4 is a front elevation view of an alternative embodiment.

An alternative embodiment of the deflector body is shown in FIG. 4. In this embodiment, the main portion of the body 1' is reduced somewhat in length from the longest desired length. A mateably shaped extension member 7 is fitted with two series of parallel holes 8, three holes being illustrated. Two mating holes 9 are provided in each of the side planes 2' of the main body portion 1'. Therefore, according to this embodiment, the length of the deflector may be varied depending upon the choice in aligning holes 8 with holes 9. Fasteners are then used to fasten together the main body 1' and the extension member 7. Thus the full height of the assembly may be varied to suit particular requirements.

Figure 5:
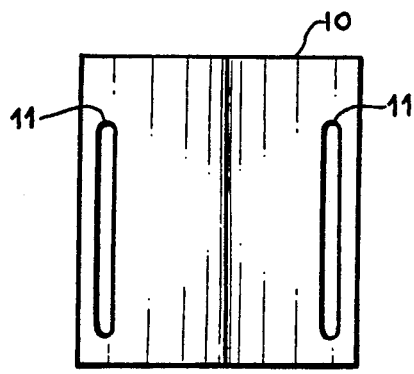
FIG. 5 is a front elevation view of an alternative embodiment.

FIG. 5 shows a yet further alternative to the variable height assembly of FIG. 4. In this alternative, an extension member 10 has slots 11 which will mate with the holes 9 in the main body 1'. Therefore, more convenience is provided for fixing the position of the extension member 10 with the added advantage of continuous variability.

An additional alternative embodiment is shown in FIG. 6. In this alternative a main body 12 has slots 13 in each of the side planes 14 extending orthogonally of its vertical center line from trailing edges 15 toward the leading edge 16. The slots 13 are intended to receive the handlebars of a bicycle being carried on the rack. Also, in this embodiment is a mating lower extension portion 17 having pivotable mounting holes 18 in tabs 19; similar to the construction described above for FIGS. 1, 2 and 3. The lower extension portion 17 has slots 20 which align with at least two holes 21 in the side planes 14 of the main body 12. In this embodiment the adjustment allows the height of the main body 12 to be varied allowing the height of slots 13 to be adjusted to accept the handlebars of the bicycle being transported. This embodiment may similarly be equipped with an upper extension portion as shown in FIGS. 4 and 5 attached by use of the holes 22.

Figure 7:
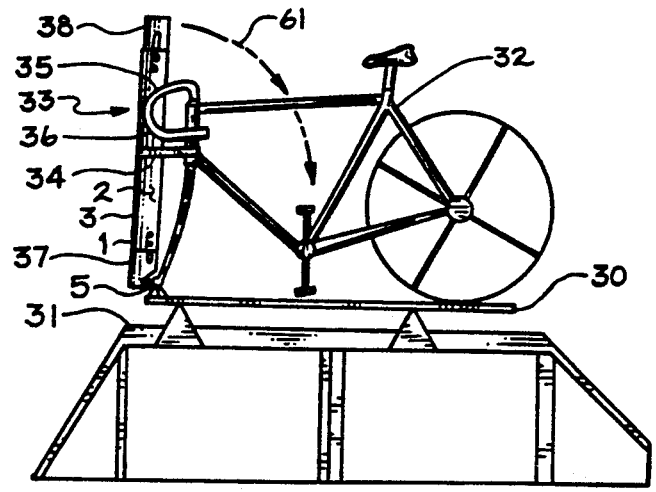
FIG. 7 is a partially schematic view of an embodiment of the invention in combination with a rack and bicycle.

Having described the essential structure and some alternative structures of the deflector itself, there now follows a description of the deflector in combination with a rack both in its upright and folded down stored position. In FIG. 7 there is shown a rack 30 mounted on the roof 31 of a vehicle with a bicycle 32 fixed on the rack 30. The deflector 33 is fixed to the rack 30 by means of the tabs 5 to form a pivotable coupling with the rack which is described in greater detail below with reference to FIG. 9. The leading edge 3 of the deflector is facing forward with the side planes 2 extending rearwardly therefrom. A strap 34 is used in order to keep the deflecting body 1 in place. Slots 35 on each side of the deflector 1 receive handlebars 36. The lower extension 37 is adjusted for the height of the handlebars 36 and the upper extension 38 is adjusted for the height of the bicycle. As more clearly shown in the front view at FIG. 8, the deflecting body 1 will shield the bicycle 32 from oncoming insects and debris and other airborne material during transport.

Figure 9:
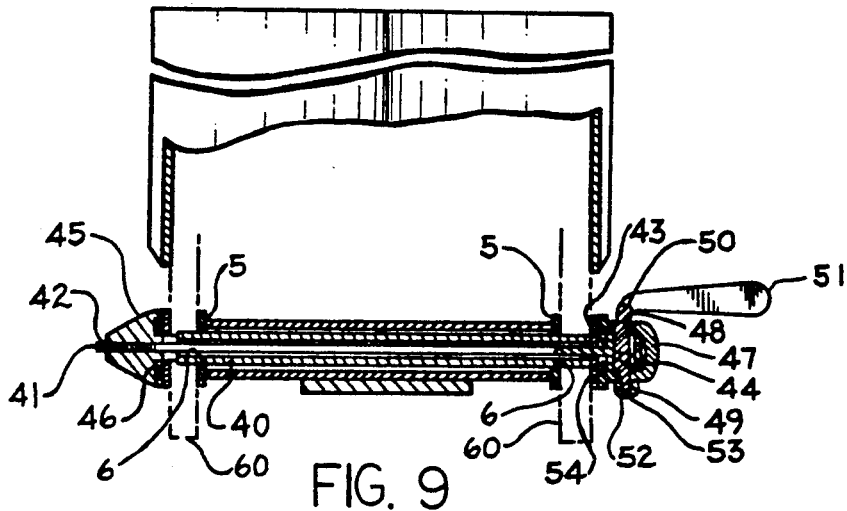
FIG. 9 is a detailed view of the pivotable coupling of the invention with the rack and bicycle of the embodiment of FIGS. 7 and 8.

In FIG. 9, as shown in a particular section view, the deflector is mounted by tabs 5 and the mounting holes 6 to the "false axle" or skewer of a fork mount transport rack; forming therewith a pivotable coupling. This particular form of the "false axle" may also be seen and is described in U.S. Pat. No. 3,848,784. In this construction, a hollow shaft 40 is of diameter close to that of the axle of a bicycle wheel. Through the shaft 40 extends a rod 41 having threads 42 at one end and at the other end of the assembly a projection 43 including a hole 44 at the other. A mounting nut 45 is tightened to the threads 42 by means of a helical spring 46. The projection 43 is crowned with a cap nut 47 having two holes 48 and 49 respectively of different diameters which are formed in diametrically opposed positions so as to correspond the hole 44 to the holes 48 and 49, thus making it possible to insert a cam means 50 in the hole 44. A cam operating lever 51 extends from one end of the cam means 50 while nut 52 which is screwably engaged with the center shaft 53 on the other end of the cam means 50 and serves to mount the cam means 50 in the inside of the hole 44. A helical spring 54 is placed between the shaft 40 and the projection 43. The full description and operation of this mechanism to receive and hold the fork 60 of a bicycle is well known, and can be found in the above-identified patent. Other constructions are also known, but they all have the common feature of presenting a false axle or skewer to receive the forks 60 of the bicycle.

In order to fit the present invention to the skewer shown in FIG. 9, the nut 45 is removed and the cam assembly and rod 40 are extracted from the opposite end. Now the tabs 5 may be set in place interiorly to the forks 60 of the bicycle, positioning the pivotable mounting holes 6 in alignment with the slots in the end of the bicycle forks 60. The standard dimension for the inside of the front forks is 3.5. The tabs 5 may also be constructed to fit exteriorly of the bicycle forks 60. Then the skewer is reassembled passing through the holes 6. In this construction, with a bicycle mounted the deflector body may be set generally vertically upward in front of the bicycle to deflect the oncoming airstream and any insects or debris and other material carried with it.

Figure 15:
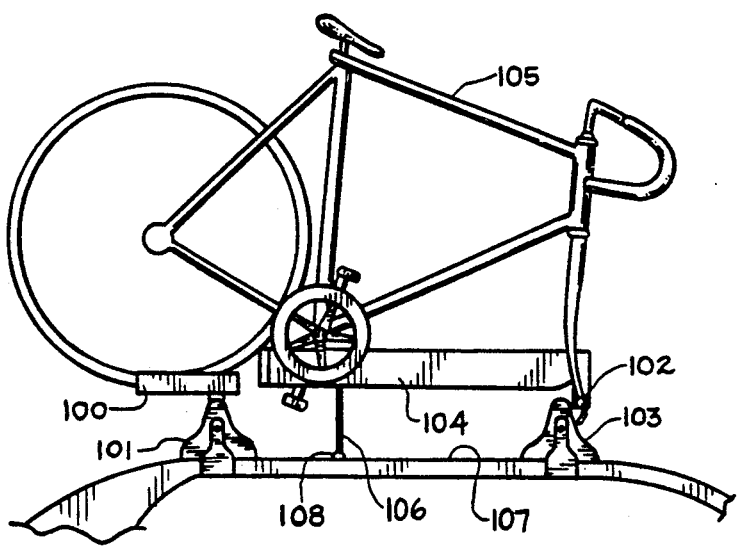
FIG. 15 is a partially schematic view of the invention and a rack and bicycle.

When there is no bicycle in transport or when there is a bicycle on the rack, but use of the deflector is not desired, as shown by the arrow 61 in FIG. 7, the pivotable coupling formed from the tabs 5 and the holes 6 and the false axle now permits the body 1 to be rotated downward and rearwardly for storage. When the rack trays do not run the length of the roof line as shown in FIG. 15, an adjustable foot post swings down to support the deflector when folded down.

Figure 11:
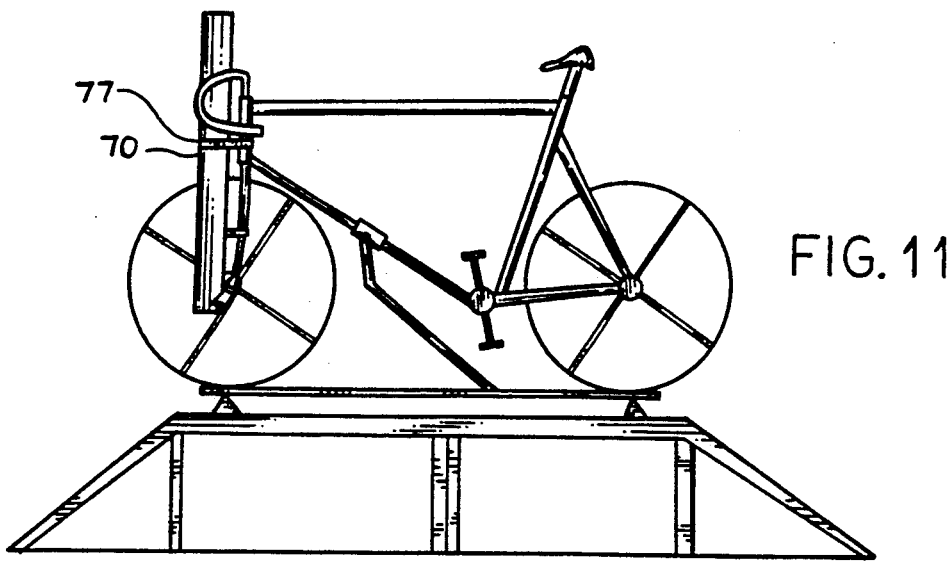
FIG. 11 is a side, partially schematic view of the embodiment of FIG. 10 in combination with a bicycle and rack.
Figure 12:
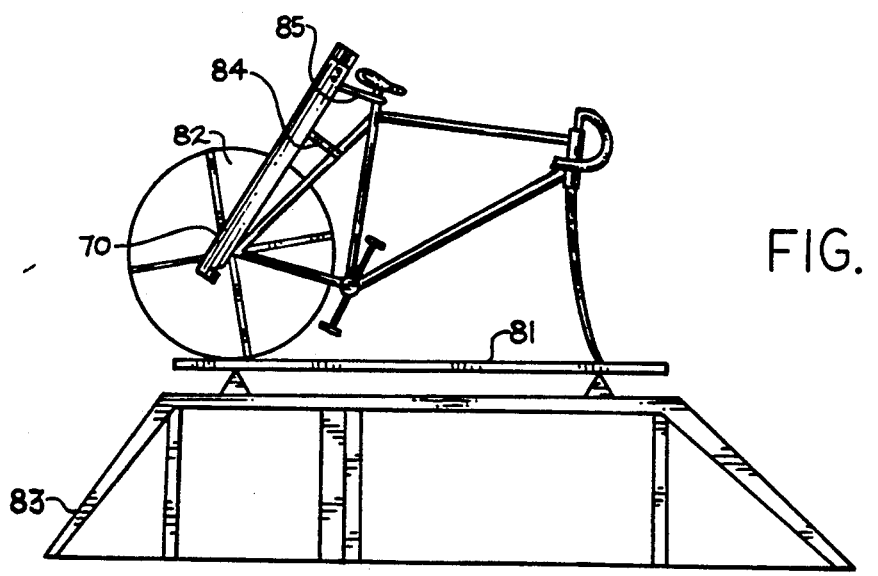
FIG. 12 is a side, partially schematic view of the embodiment of FIG. 11 mounted on a bicycle with its rear tire toward the front of the passenger vehicle.

For applications where the bicycle is set on the rack upright with wheels attached, another embodiment of the invention is employed. In this embodiment as shown in FIGS. 10, 11 and 12, the body 70 is formed as described above, having side planes 71, a leading edge 72, trailing edges 73, tabs 74 and holes 75. In this configuration a slot 76 is formed symmetrically of the body 70. The shape of the slot is such as to receive a bicycle wheel. This embodiment is used by placing the body in front of the bicycle with the wheel of the bicycle received in the slot 76, as shown in FIG. 11. The deflector is held to the bicycle by straps 77, for example straps fitted with hook and loop fastener means sold under the trademark Velcro. In this configuration the bicycle wheel which protrudes through the slot 76 functions as the leading edge of the deflector.

In order to render this embodiment universal, that is, able to be used when the bicycle is mounted as shown in FIGS. 7, 8 and 9; a cover piece 78 is employed which covers the slot 76. The cover piece may be held to the body 70 by fasteners through the holes 79 and 80 in the cover 78 and the body 70 respectively. FIG. 12 illustrates use of the wind deflector of FIG. 10 on a bicycle mounted on a roof rack 81 with its rear wheel 82 toward the front of the car instead of its front wheel as shown in FIG. 11. The body 70 mounts around the rear wheel and is secured to the bicycle by straps 84 and 85.

Figure 13:
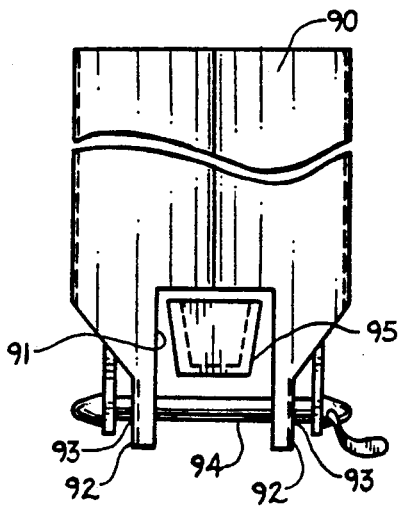
FIG. 13 is a front elevational view of an embodiment of the invention.
Figure 14:
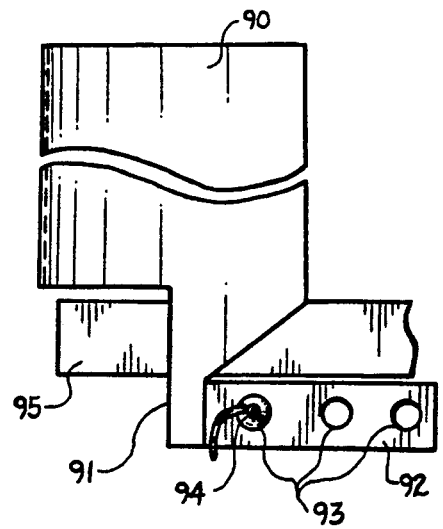
FIG. 14 is a side elevational view of the embodiment of FIG. 13.
Figure 16:
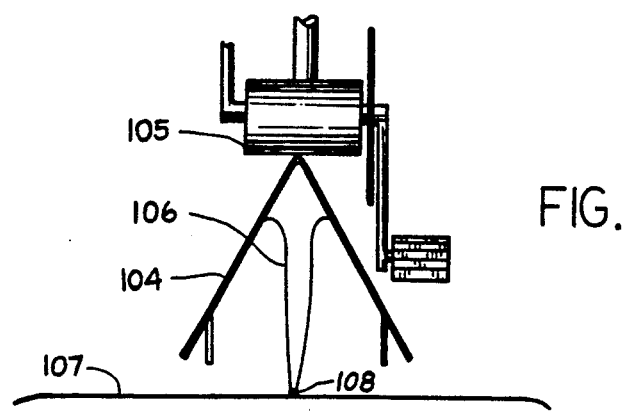
FIG. 16 is a front partial view of FIG. 15.
Figure 28:
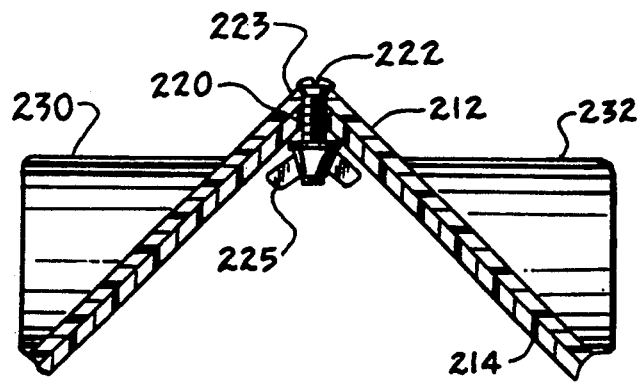
FIG. 28 is a sectional view through 28—28 of FIG. 26.

In FIGS. 13 and 14, there is shown a configuration which is suitable for use with racks of the type in which the skewer or false axle is below the rack tray in which the rack tray may project forwardly in front of the skewer. In this embodiment, the deflector 90 has an opening 91, and the tab 92 is elongated rearwardly and has a series of holes 93. In operation, the appropriate hole 93 is chosen to be pivotally connected with the skewer 94 so that upon pivoting rearwardly the deflector will clear the rack tray 95. FIGS. 15 and 16 show this embodiment in the stored position in a type of rack in which the rack tray 100 is only on the rear roof support 101. The skewer 102 is on the front roof support 103. The deflector 104 fits under the bicycle 105 and is held in position by a wire loop 106 extending to the roof 107 of the vehicle. A rubber protector 108 will prevent scratching of the roof.

Therefore, in use during transportation of a bicycle, the deflector will effectively protect the bicycle. In its storage position, the invention will be neatly stored without interference with operation of the vehicle either with or without a bicycle being transported.

Another embodiment of a deflector the invention is shown in FIGS. 17 through 28.

This embodiment is particularly adapted for being fitable to all known varieties of racks, giving the range of pivoting from the upright in-use position, to the stored position; without any interference with the rack parts.

The deflector of this embodiment is shown by itself in FIGS. 17-22. This deflector is shown in application in FIGS. 23-27.

As shown, in FIGS. 23 through 26 an exemplary rack is shown of the type made by Yakama and known as a Full Tray Rack. This rack has a tray or channel 200, attached at the rear to crossbar 202 and at the front to mounting clamp 204 which is mounted on front crossbar 206. Also on the mounting clamp 204 is a false axle 208. A bicycle 210 is shown in position in broken lines in FIGS. 23, 24 and 25. The tray 200 extends forwardly beyond and about the axis of false axle 208, therefore having the potential to interfere with operation of the deflector 211 in being moved between the upright position and the stored position. A radius R is shown in FIG. 26 extending from the center of the false axle 208 to the point of the rack, in this case a point of the tray 200, which is furthest from the center of the false axle 208 within the swing of the deflector 211 between its two positions. The Yakama rack presents the largest radius R, of those products presently known to be available, being measured at $3\frac{1}{4}$ inches. Also the center of the false axle 208 is about $2\frac{5}{8}$ inches directly below the upper edge of the channel 200.

The deflector 211 has a main body 212, a lower portion 214, and mounting brackets 216, 218. The main body 212 and the lower portion 214 are adjustably connected by means of a slot 220 in the lower portion 214 and screws 222 passing through holes 223 in the main body 212 and secured by wing nuts 225. The brackets are attached to the lower portion 214 by bolts 224 passing through holes 227 to nuts 229. The lower portion 214 terminates in a nose rim 226. The brackets could be mounted in alternative holes 227 if less height above the tray 200 is required.

The main body 212 and the lower portion 214 are made of plastic, formed into a parting shape and are nested to adjustably slide when the screws 222 are loosened, and to be fixed when the screws 222 are tightened. The main body 212 has a pair of hubs 228,230 which provide horizontal locating recesses 232,234 for locating it at the bicycle handlebars 236. This sets the proper height of the main body 212 for the particular bicycle. Then, the screws 222 can be tightened. When in the upright in-use position, a strap 235 will hold the deflector 211 firmly in place. Other means could be provided to hold the deflector 211 firmly against the bicycle.

The brackets 216 and 218 are bent from metal. They could be combined into a single bent metal piece 238, as shown in FIG. 27C.

The brackets either 216 and 218; or 238 are shaped into several elements whose effect is to provide such position and pivoting movement to avoid interference with various parts of racks and bicycle while placing the deflector in a correct upright position when in use and in a good horizontal position when stored. These positions are shown in FIGS. 23, 24, 25. The brackets 216,218 will be described and defined in their upstanding position as shown in FIGS. 23, 24 and 25; however the shape of the brackets 216,218 is also shown in the other Figures. On each of brackets 216,218 an angled horizontal element 242,244 extends from near the center of the lower portion 214, laterally and horizontally outward in contact with the inside wall of the lower portion 214. Then, upper horizontal offsetting elements 246,248 extends rearwardly horizontally from the angled horizontal elements 242,244. Then, vertical offsetting elements 250,252 extend vertically, downwardly from the upper horizontal offsetting elements 246,248. Then lower horizontal elements 254,256, extending from the lower end of the vertical offsetting elements 256,252 being bent at 257 in order to present tab portions 258,260 perpendicular to the axis of the false axle 208. Each of the tabs 258,260 have a closed hole 262,264 respectively through which the false axle 208 passes.

As can be seen in FIGS. 23, 24 and 25 and in phantom lines in FIG. 26 the vertical offsetting elements 250,252 place the deflector body, that is the lower portion 214 in particular the nose rim 226 above the rack tray 200.

As can be seen in FIG. 26, the upper horizontal offsetting elements 246,248 function to keep the deflector 211, that is the lower portion 220 and the main body 222 in a parallel position relative to the channel 200 when in the stored position.

Also, the lower horizontal elements 254,256 being relatively short, fit in the space indicated at M between the false axle 208 and the front crossbar 206, when the deflector 211 is in the upright in-use position. The offsetting effect of the lower horizontal portions 254,256 prevent interference by the brackets with the bicycle forks and any accessary mounted on the forks near the false axle 208 as can be most clearly seen in FIGS. 24 and 25.

In use, with a bicycle in place as in FIGS. 23, 24 and 25, the deflector is mounted on the false axle 208 by reason of the false axle 208 passing through the closed holes 262, 264. Therefore this coupling of the bracket 216, 218 to the false axle is a fixed mounting, permanently retained against uncoupling subject only to release if the false axle 208 is disassembled. With the forks 210 also in place in the false axle 208, operation of the tightening mechanism by the lever 262, will securely tighten and hold the bicycle in place and prevent rotation of the deflector 211 all as explained above for other embodiments. In the upright position the strap 236 is used to secure the deflector against the bicycle, so that it is not necessary to depend on the tightness and strength of the brackets in the false axle.

When the bicycle 210 is absent, the deflector 211 can be pivoted downward as shown in FIG. 26 the shape of the brackets allowing neat parallel nesting of the deflector to the tray 200. The closed holes 262,264 will retain the brackets 216,218 against uncoupling from the false axle 208 despite being loose on the false axle 208, as explained previously. FIG. 26 also shows in phantom lines the deflector up-pivoted upward to the upright position.

Referring to the radius R, it can be seen that the offsetting effect of the bracket shape keeps in particular the vertical offset the nose rim 226 outside the radius R, in this case by a distance N. The particular shape chosen for the brackets 216,218 accommodates the shape of the tray 200 and the deflector 211. Other shapes for the brackets could be employed so long as they accomplish keeping the nose rim 226 outside the radius R, and also prevent interference with other parts of the rack and parts of the bicycle. In general such shapes must offset the deflector 211 to be able to lie above and parallel to the tray 200 in the stored position and to permit it to pivot upward and be offset to clear all parts as mentioned above in the upward position.

Figure 29:
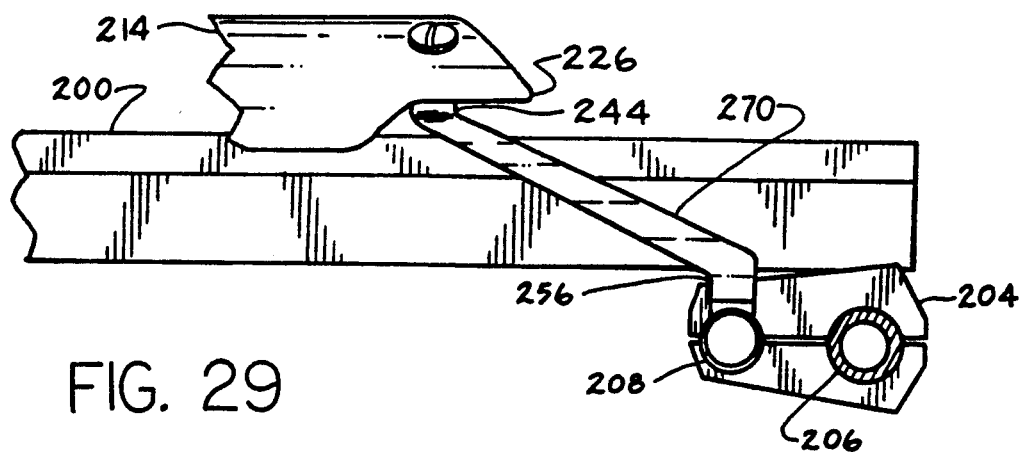
FIG. 29 is a side elevational view showing an alternate construction of the bracket.

As is evident, the shape of the brackets is conveniently arrived at for forming them from sheet metal material. As seen in FIG. 29 with a more complex manufacturing procedure, the shape can be simplified to provide a single strut 270 extending from the deflector 211 to the lower horizontal offsetting elements 254,256 coupled on the false axle 208, the strut extending at an angle which places the deflector in both its upright and stored positions in the same places as previously described for the construction shown in FIG. 26; the strut 270 in a sense being the hypotenuse of a triangle of which the horizontal offset portion 246,248 and the vertical offset portion 250,252 would form sides.

Although particular embodiments of the invention have been described and illustrated herein, it is recognized that modifications and variations may readily occur to those skilled in the art, and consequently it is intended that the claims be interpreted to cover such modifications and equivalents.

I claim:

1. An airstream deflector apparatus for use with a rooftop bicycle rack having a false axle assembly for receiving the forks of a bicycle comprising:

a body shaped to substantially shield a bicycle mounted on the rack from the oncoming air stream when a vehicle on which it is mounted is in motion; and a pivotable coupling mount extending from a lower portion of the body comprising a pivot element defined by a pair of parallel spaced apart tabs each tab having a generally vertical flat area surrounding a hole and said spacing apart of dimensions that the tabs will fit in the fork receiving spaces of a false axle each adjacent a bicycle fork when present by the false axle passing through said hole and said tabs have a combined thickness such that a false axle can clamp tight on the tabs when a bicycle fork is present and will be loose on the false axle when a bicycle fork is absent to allow the deflector to pivot on the false axle between an upright locked in place position in front of a bicycle on the rack and by rearward pivoting to a stored position the coupling mount being loosely retained against uncoupling from the false axle in the stored position when no bicycle fork is in place in the false axle.

2. The apparatus of claim 1 wherein the body is of an elongated shape extending from a lower terminus to an upper terminus and formed into a parting cross section along its elongated dimension to deflect the oncoming airstream substantially evenly to each side out of the path of the bicycle mounted on the rack.

3. The apparatus of claim 2 wherein the apparatus further comprises a separate extension portion, means for adjustably fastening the extension portion to the body whereby the length of the deflector can be varied by adjusting the extension portion.

4. The apparatus of claim 2 wherein the body comprises a main portion having slots formed therein to receive the handlebars of a bicycle mounted on the rack and a lower portion, where the lower portion is adjustably fastened to the main portion to permit adjustment of the main portion relative to the rack and the bicycle mounted on the rack in order to adjust the placement of the slots to receive the handlebars of the bicycle and wherein the coupling mount extends from a lower terminus of the lower extension portion.

5. The apparatus of claim 4 further comprising an upper extension portion, means for adjustably fastening the upper extension portion proximate to the upper terminus of the main portion of the body whereby the length of the body can be varied by adjusting the upper portion.

6. The apparatus of claim 2 wherein the body has an opening extending from its lower terminus, centrally upwardly whereby the wheel of a bicycle may be received in the opening, and the wheel presenting a leading edge to the oncoming airstream.

7. An airstream deflector apparatus for use with a vehicle rooftop bicycle rack having a false axle assembly for receiving the fork of a bicycle comprising:
   a body portion of elongated shape extending from a lower terminus to an upper terminus, and formed into a parting cross section along its elongated dimension to deflect an oncoming airstream substantially evenly to each side and being adjustable in length said body comprising a main body portion having said upper terminous thereon, and a lower portion having said lower terminus thereon the main body portion being adjustably mounted above the lower portion for vertical height adjustment and adjustment means permitting the height of the main body portion to be vertically adjusted;
   slots formed into the main body portion for receiving the handlebars of a bicycle;
   a pivotable coupling mount extending from the lower terminus of the lower body extension for pivotably coupling with the false axle on a rack and comprising a pivot element having a hole and mountable by the false axle passing therethrough against uncoupling whereby the deflector may be placed in an upright position in front of a bicycle on the rack, height adjusted by placing the handlebars in the slots, and when the bicycle is absent the deflector may be pivoted to a generally horizontal stored position while being retained against uncoupling from the false axle.

8. An airstream deflector for use with a rooftop bicycle rack having a false axle assembly for receiving the fork of a bicycle a mounting assembly for roof mounting the rack onto a vehicle roof and a bicycle mounting assembly for holding a bicycle on the rack comprising;
   a deflector body having a lower terminal end and a forward facing surface;
   a mounting bracket attached to the deflector the mounting bracket having a horizontal offset portion extending from near the lower terminal end laterally away from the deflector body in a direction away from the forward facing surface a preselected distance and a vertical offset portion extending downwardly from a rearmost end of the horizontal offset portion and a mounting tab at a bottom end of the vertical offset portion, the mounting tab having means for mounting onto a false axle.

9. The airstream deflector of claim 8 wherein the mounting tab extends laterally rearwardly of the deflector body a preselected distance.

10. The airstream deflector of claim 9 wherein said bracket extends from one side of the deflector body and another mirror image shaped bracket extends from the other side of deflector body.

11. The airstream deflector of claim 9 wherein the bracket will place the deflector body lower terminal end a least distance greater than 3½ inches radially from the center line of the false axle.

12. The airstream deflector of claim 10 wherein said means for mounting on a false axle is adapted to be retained against uncoupling from the false axle when no bicycle fork is in place in the false axle.

13. The airstream deflector of claim 10 wherein said each of said tabs is mountable on the false axle to be adjacent one of the forks of a bicycle when present for being clamped when both the tabs and bicycle forks are present.

14. In combination an airstream deflector and a bicycle roof rack of the type having a false axle for receiving and clamping onto the forks of a bicycle comprising:
   a false axle having spaced apart clamping positions to receive the forks of a bicycle;
   a body shaped to substantially shield a bicycle mounted on the rack from the oncoming air stream when a vehicle on which it is mounted is in motion; and a pivotable coupling mount extending from a lower portion of the body comprising a pivot element defined by a pair parallel spaced apart tabs each tab having a generally vertical flat area surrounding a hole and said spacing apart of dimensions that the tabs will fit in the fork receiving spaces of a false axle each adjacent a bicycle fork when present by the false axle passing through said hole and said tabs have a combined thickness such that a false axle can clamp tight on the tabs when a bicycle fork is present and will be loose on the false axle when a bicycle fork is absent to allow the deflector to pivot on the false axle between an upright locked in place position in front of the bicycle on the rack and by rearward pivoting to a stored position the coupling mount being loosely retained against uncoupling from the false axle in the stored position when no bicycle is in place in the false axle.

* * * * *